United States Patent [19]
Fitzgerald et al.

[11] Patent Number: 5,480,725
[45] Date of Patent: Jan. 2, 1996

[54] FUSING MEMBER HAVING TIN-FILLED, ADDITION CURED LAYER

[75] Inventors: John J. Fitzgerald, Clifton Park; Wayne T. Ferrar, Fairport; Tonya D. Binga; Michael W. Fichtner, both of Rochester, all of N.Y.

[73] Assignee: Eastman Kodak Company, Rochester, N.Y.

[21] Appl. No.: 306,066

[22] Filed: Sep. 14, 1994

[51] Int. Cl.$^6$ .................................................. B32B 9/00
[52] U.S. Cl. .................... 428/447; 428/36.8; 428/36.9; 428/331; 428/339; 428/405; 428/323; 355/282; 355/285
[58] Field of Search ................................. 428/447, 422, 428/323, 36.8, 36.9, 331, 339, 405; 430/99, 124; 355/285, 284, 282; 528/31, 32, 28

[56] References Cited

U.S. PATENT DOCUMENTS

| | | |
|---|---|---|
| 4,264,181 | 4/1981 | Lentz ......................................... 430/99 |
| 4,373,239 | 2/1983 | Henry et al. . |
| 4,375,505 | 3/1983 | Newkirk . |
| 4,430,406 | 2/1984 | Newkirk et al. . |
| 4,501,482 | 2/1985 | Stryjewski . |
| 4,518,655 | 5/1985 | Henry et al. . |
| 4,853,737 | 8/1989 | Hartley et al. . |
| 4,935,785 | 1/1990 | Wildi ....................................... 355/285 |
| 5,281,506 | 1/1994 | Badesha ................................. 428/422 |
| 5,296,568 | 3/1994 | Chen ......................................... 528/31 |

OTHER PUBLICATIONS

J. J. Fitzgerald et al., "The Effect of Cyclic Stress on the Physical Properties of a Poly(Dimethylsiloxane) Elastomer," *Polymer Engineering and Science*, vol. 32, No. 18, (Sep. 1992), pp. 1350–1357.

*Primary Examiner*—Patrick J. Ryan
*Assistant Examiner*—Patrick R. Jewik
*Attorney, Agent, or Firm*—Anne B. Kiernan; Robert Luke Walker

[57] ABSTRACT

A fuser member having a core and a layer overlying the core. The layer includes: an addition crosslinked polyorganosiloxane elastomer, and tin oxide particles dispersed therein in a concentration of from 20 to 40 percent of the total volume of the layer.

20 Claims, 2 Drawing Sheets

FUSING MEMBER HAVING TIN-FILLED, ADDITION CURED LAYER

FIELD OF THE INVENTION

This invention relates to a fuser roll useful for heat-fixing a heat-softenable toner material to a substrate. More particularly, the invention relates to a fuser roll having improved stability under conditions of elevated temperature and cyclic stress.

BACKGROUND

Heat-softenable toners are widely used in imaging methods such as electrostatography, wherein electrically charged toner is deposited imagewise on a dielectric or photoconductive element bearing an electrostatic latent image. Most often in such methods, the toner is then transferred to a surface of another substrate, such as, for example, a receiver sheet comprising paper or a transparent film, where it is then fixed in place to yield the final desired toner image.

When heat-softenable toners, comprising, for example, thermoplastic polymeric binders, are employed, the usual method of fixing the toner in place involves applying heat to the toner once it is on the receiver sheet surface to soften it and then allowing or causing the toner to cool.

One such well-known fusing method comprises passing the toner-bearing receiver sheet through the nip formed by a pair of opposing rolls, at least one of which (usually referred to as a fuser roll) is heated and contacts the toner-bearing surface of the receiver sheet in order to heat and soften the toner. The other roll (usually referred to as a pressure roll) serves to press the receiver sheet into contact with the fuser roll.

The fuser roll usually comprises a rigid core covered with a resilient material, which will be referred to herein as a "base cushion layer." The resilient base cushion layer and the amount of pressure exerted by the pressure roll serve to establish the area of contact of the fuser roll with the toner-bearing surface of the receiver sheet as it passes through the nip of the pair of rolls. The size of this area of contact helps to establish the length of time that any given portion of the toner image will be in contact with and heated by the fuser roll. The degree of hardness (often referred to as "storage modulus") and stability thereof, of the base cushion layer are important factors in establishing and maintaining the desired area of contact.

Also, often the pressure roll and fuser roll have a regular cylindrical shape, but it has been found in the prior art to be advantageous in some cases to change the shape of the pressure roll in order to vary the amount of pressure exerted by the pressure roll against the receiver sheet and fuser roll. This variance of pressure, in the form of a gradient of pressure that changes along the direction through the nip that is parallel to the axes of the rolls, can be established, for example, by continuously varying the overall diameter of the pressure roll along the direction of its axis such that the diameter is smallest at the midpoint of the axis and largest at the ends of the axis, in order to give the pressure roll a sort of "bow tie" or "hourglass" shape. This will cause the pair of rolls to exert more pressure on the receiver sheet in the nip in the areas near the ends of the rolls than in the area about the midpoint of the rolls. This gradient of pressure helps to prevent wrinkles and cockle in the receiver sheet as it passes through the nip.

However, if over time of use, the fuser roll begins to permanently deform to conform to the shape of the pressure roll, the gradient of pressure will be reduced or lost, along with its attendant benefits. It has been found that permanent deformation (alternatively referred to as "creep") of the base cushion layer of the fuser roll is the greatest contributor to this problem.

In the past, it has been thought that various materials' suitability for use in fuser roll base cushion layers in terms of their stability during use—i.e., their ability to resist degradation (as evidenced by weight loss), creep, and changes in hardness, during use in fuser rolls—could be determined by subjecting samples of the materials to conditions of continuous high temperature and continuous high stress (i.e., pressure), and then measuring the resultant changes in weight, shape (e.g., length), and hardness (e.g., storage modulus). However, the present inventors have unexpectedly found that such testing is not a very good predictor of the stability the materials will exhibit during actual use in fuser roll base cushion layers.

The present inventors theorized that the lack of consistent correlation of such test results to the degree of stability many materials exhibit during actual use in fuser rolls, was due to the fact that while materials are indeed subjected to conditions of continuous high temperature during use in fuser rolls, the conditions of high stress they are subjected to during such use are not in fact continuous, but rather are cyclic. This is because the stress that any given portion of the fuser roll experiences increases significantly as the portion passes through the nip between the rolls as they rotate and decreases as that portion leaves the nip area.

Accordingly, the present inventors have helped to develop a device called a Mechanical Energy Resolver (sometimes alternatively referred to herein as an "MER"), which can be used to test samples of materials of interest for use in fuser roll base cushion layers. The device applies heat continuously to maintain the samples at a constant elevated temperature. The device also applies stress to the samples in the form of a compressive force, but does so in a manner such that the amount of compressive force applied varies cyclicly (i.e., sinusoidally). The results of such testing consistently correlate with, and therefore reliably predict, the degree of stability a material will exhibit in the base cushion layer of a fuser roll during actual use.

One type of material that has been widely employed in the past to form a resilient base cushion layer for fuser rolls is condensation-crosslinked poly(dimethylsiloxane) elastomer. "Poly(dimethylsiloxane)" will sometimes be alternatively referred to herein as "PDMS". The prior art has also taught or suggested that various fillers comprising inorganic particulate materials can be included in such PDMS base cushion layers to improve their mechanical strength and/or thermal conductivity. Higher thermal conductivity is advantageous when the fuser roll is heated by an internal heater, so that the heat can be efficiently and quickly transmitted toward the outer surface of the fuser roll and toward the toner on the receiver sheet it is intended to contact and fuse. Higher thermal conductivity is not so important when the roll is intended to be heated by an external heat source. Disclosure of such filled condensation-cured PDMS elastomers for fuser rolls can be found, for example, in U.S. Pat. Nos. 4,373,239; 4,430,406; and 4,518,655.

One specific example of a condensation-crosslinked PDMS elastomer, which contains about 32–37 volume percent aluminum oxide filler and about 2–6 volume percent iron oxide filler, and which has been widely used and taught to be useful in fuser rolls, is sold under the trade name, EC4952, by the Emerson Cummings Co., U.S.A. However, it has been found that fuser rolls containing EC4952 cushion layers exhibit serious stability problems over time of use, i.e., significant degradation, creep, and changes in hardness, that greatly reduce their useful life. The present inventors have also found that MER test results correlate with and thus accurately predict the instability exhibited during actual use. Nevertheless, materials such as EC4952 initially provide very suitable resilience, hardness, and thermal conductivity for fuser roll cushion layers.

It would therefore be very desirable to be able to provide a fuser roll with a base cushion layer comprising a addition crosslinked PDMS elastomer containing appropriate fillers, wherein the cushion layer material will exhibit, under conditions of elevated temperature and cyclic stress, good stability, i.e., good resistance to degradative weight loss, creep, and changes in hardness. The present invention meets this need.

SUMMARY OF THE INVENTION

The invention provides a fuser member having a core and a layer overlying the core. The layer includes: an addition crosslinked polyorganosiloxane elastomer, and tin oxide particles dispersed therein in a concentration of from 20 to 40 percent of the total volume of the layer.

The addition crosslinked layer has been unexpectedly found to exhibit only minimal weight loss, creep, and changes in hardness, over time, when subjected to conditions of elevated temperature and cyclic stress.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein.

DESCRIPTION OF PARTICULAR EMBODIMENTS

The addition-crosslinked siloxane elastomer in the base cushion layer of fuser rolls provided by the invention can be formed by addition reaction of vinyl substituted multifunctional siloxane polymers with multifunctional organo-hydrosiloxanes.

Vinyl substituted multifunctional siloxane polymers and their preparation are well known to those skilled in the art. The vinyl substituted multifunctional siloxane polymers have the following repeating subunits:

and terminal subunits having the general structure:

Designations, such as $Z^r$, R, and L, in all structural formulas herein; are used in a uniform manner and have the following meanings.

R is alkyl having from 1 to 8 carbons, or aryl having a solitary ring and from 6 to 14 carbons including carbons of any ring substituents. Less than 25 percent of the R groups are aryl. Specific examples of R groups include: methyl, ethyl, propyl, butyl, and phenyl. R groups can be substituted, however, substituents should not degrade the characteristics of the resulting elastomer. For example, R groups that react with olefins or organo-hydrosiloxanes are highly undesirable. A specific example of R substitution of a siloxane polymer is: R= about 3 to 16 percent phenyl and about 97 to 84 percent methyl.

Z is an olefinic group having from 2 to 8 carbons and a terminal vinyl moiety. Specific examples of Z groups include: vinyl and allyl.

$Z^r$ represents Z or R, subject to the limitation that each molecule of vinyl substituted multifunctional siloxane polymer has two or more Z moieties (and thus 2 or more terminal vinyl groups).

L is —O— or —$(CH_2)_e$—, where e is an integer from 1 to about 8.

The vinyl substituted multifunctional siloxane polymers can be represented, at least in so far as the currently preferred embodiments of the invention, by the general structure (referred to herein as "structure I"):

Each repeating subunit that has one or more L moieties (also referred to herein as branching subunits) represents a branch point. Branches may extend outward in the form of a dendrite or star, or may form crosslinks to other chains. The value of p, the number of terminal units on branches, is equal to of less than the total number of branching units, j+2k, and may be as low as zero if all branching subunits form crosslinks.

The extent of branching or crosslinking of the siloxane polymer is low, since the resulting elastomer would otherwise be excessively hard. If n+m+j+k is defined as being equal to 100 mole percent; then j+k is less than 5 mole percent, and preferably is from 2 mole percent to 0 mole percent. The latter represents a preferred siloxane polymer, in which branching subunits are completely or substantially excluded. For this polymer, structure I can be simplified to the following (structure II):

The siloxane polymer has at least two olefinic functionalities (in structures I or II; Z, or $Z^r$, or a combination of Z and $Z^r$). The percentage of silicon atoms substituted by an olefinic moiety can be higher than two, but must be low enough to prevent the resulting elastomer from being excessively hard due to extensive crosslinking. It is preferred that the percentage of silicon atoms substituted by an olefinic moiety is less than 3 percent of the total number of silicon atoms; or, more preferably, less than 2 percent of the total number of silicon atoms.

In some other embodiments of the invention, $Z^r$ is R. In one such embodiment, structure II can be simplified as (structure IV):

In particular embodiments of the invention, Z or $Z^r$ groups each have the general structure where d is an integer from 0 to about 6 and preferably from 0 to 3. In one such embodiment, the siloxane polymer has the general structure (structure V):

A specific example of such a siloxane polymer is vinyldimethyl terminated polydimethylsiloxane, which has the general structure:

Another example is a vinyldimethyl terminated dimethyl-diphenyl copolymer, which has the general structure:

In particular embodiments of the invention, the value of m is 0 or 1 and $Z^r$ is olefinic. In one such embodiment, structure II can be simplified as (structure III):

where $n^1+n^2=n$ and $n^1/n^2$ is greater than 3/1. Both of these materials are commercially available from Huls America, Inc., Piscataway, N.J., under various designations depending upon the viscosity (and values of n or $n^1$, $n^2$, and n).

In another such embodiment, the siloxane polymer has the general structure (structure VI):

The designations n, m, and d have the same meanings as given above. A specific example of such a siloxane polymer is vinylmethyl siloxane copolymers in which each R is methyl.

In the structural formulas above, the values of n, or n+m, or n+m+j+k, are integers such that the respective polymer has a weight average molecular weight of from 7,000 to 100,000. If the molecular weight were above 100,000, the final crosslinked polymer would be too unstable under conditions of high temperature and cyclic stress (i.e., there would be too much creep and change in hardness over time), even when filler is dispersed therein in accordance with the invention. If the molecular weight were below 7,000, the final crosslinked elastomer would have a high crosslink density that would make the material too hard and brittle, and not resilient enough to serve practically in a base cushion layer. (For the siloxane polymers of structure I, a standard for "excessive hardness" is established by final crosslinked elastomer prepared using siloxane polymer having a molecular weight below 7,000. Any final crosslinked elastomer having a similar or greater hardness is excessively hard.)

The multifunctional organo-hydrosiloxanes that can serve as crosslinking agents for the structure I polymers have the general structure:

(VII)

Each T represents:

or both T's together represent atoms completing an organo-hydrosiloxane ring, such that structure VII can be rewritten:

$R^a$ represents the same groups as R: alkyl having from 1 to 8 carbons, or aryl having a solitary ring and from 6 to 14 carbons including carbons of any ring substituents. Specific examples of $R^a$ groups include: methyl, ethyl, butyl, and phenyl. $R^b$ represents H or $R^a$. At least two $R^b$ moieties are H. It is currently preferred that $R^a$ be methyl. It is currently preferred that T be trimethylsilyl. The value of q is from 3 to about 300. A specific example of a suitable multifunctional organo-hydrosiloxane is a material marketed as PS123, by Huls of America, Piscataway, N.J. This material has the general structure:

where $q^1+q^2=q$, and a molecular weight of about 2,000–2,500. Another example is 1,3,5,7-tetramethylcyclotetrasiloxane, which is also available from Huls of America.

The addition crosslinking reaction is carried out with the aid of a late transition metal catalyst, such as cobalt, rhodium, nickel, palladium or platinum catalysts. Specific examples of such catalysts include chlorotris(triphenylphosphine) rhodium(I), $RhCl(Ph_3P)_3$; dicobaltoctacarbonyl, $Co_2(CO)_8$; and chloroplatinic acid, $H_2PtCl_6$. Chloroplatinic acid is currently preferred. In a particular embodiment of the invention, the catalyst is added as a complex with vinyl-terminated polysiloxane. Currently preferred is a catalyst complex sold commercially as PC075 by Huls of America. This material is a complex of chloroplatinic acid and vinyl terminated dimethylsiloxane and has a platinum concentration of 2 to 3 percent. It is also currently preferred that the PC075 complex be diluted with vinyl-terminated dimethylsiloxane polymer to provide a final platinum concentration of from 0.3–1.2 parts per million, depending upon the desired cure rate. A suitable polysiloxane diluent is marketed by Huls of America as PS441.2 (viscosity= 200).

The tin oxide particles employed as filler in the base cushion layer of a fuser member of the invention can be obtained from any convenient commercial source, for example, Magnesium Elektron, Inc., Flemington, N.J., U.S.A. The particle size does not appear to be critical. Particle sizes anywhere in the range of 0.1 to 100 micrometers have been found to be acceptable. In the examples presented below the tin oxide particles were from 1 to 40 micrometers in diameter.

The tin oxide filler particles are mixed with the structure (I) polymer and multifunctional organo-hydrosiloxane crosslinker prior to curing the mix on the fuser member core to form the base cushion layer. The tin oxide particles comprise from 20 to 40 percent of the total volume of the base cushion layer. Concentrations less than 20 volume percent may not provide the degree of stability desired to the layer. Concentrations greater than 40 volume percent will render the layer too hard to provide the desired area of contact with the toner-bearing receiver sheet.

In cases where it is intended that the fuser member be heated by an internal heater, it is desirable that the base cushion layer have a relatively high thermal conductivity, so that the heat can be efficiently and quickly transmitted toward the outer surface of the fuser member that will contact the toner intended to be fused. Tin oxide filler particles increase the thermal conductivity of an addition-crosslinked siloxane base cushion layer. When tin oxide particles are dispersed in the base cushion layer at a concentration of from 30 to 40 percent of the total volume of the layer, the thermal conductivity of the layer is at least as high as prior art base cushion layer formulations, such as the previously mentioned EC4952.

Fuser members in accordance with the invention can also have one or more other layers over the base cushion layer, if desired. This allows one not to be concerned with the wear-resistance and toner-release properties of the base cushion layer. Properties such as abrasion-resistance and the ability to fuse toner without having some of the toner adhere to the fuser member and be pulled away from the receiver sheet as it exits the nip of the rolls, can be provided by such other layer or layers over the base cushion layer, as is well known in the art.

Also, in some fusing systems a release oil, such as a poly(dimethylsiloxane) oil, is continually provided and coated over the outermost surface of the fuser member during use, in order to aid the roll in releasing from the toner it contacts during the fusing operation. If such oil contacts the addition-crosslinked siloxane base cushion layer, it can cause the layer to swell and change its shape undesirably and can also cause other undesirable degradative effects such as loss of adhesion of the base cushion layer to the fuser member core. Materials for the other layer or layers over the base cushion layer can be chosen to provide a barrier that prevents such release oil from coming into contact with the base cushion layer, as is also well known in the art.

For description of other layers and materials therefor that can be usefully provided over fuser member base cushion layers, see, for example, U.S. Pat. Nos. 4,375,505; 4,430,406; 4,501,482; and 4,853,737. In some specific embodiments of the present invention, the base cushion layer has one other layer thereover, which is an oil-barrier layer comprising poly(vinylidene fluoride-co-hexafluoropropylene), a material commercially available, for example, from DuPont, U.S.A., under the trademark, Viton A. In some other specific embodiments, there are two layers over the base cushion layer, e.g., an oil-barrier layer and, thereover, an outermost layer that provides good wear-resistance and toner-release properties, comprising, for example, a vinyl-addition-crosslinked siloxane having silica and titania fillers dispersed therein, such as is commercially available from Dow-Corning, U.S.A., under the trademark, Silastic E.

Usually, the other layer or layers, when employed, are flexible but thinner than the base cushion layer, so that the base cushion layer can provide the desired resilience to the fuser member, and the other layers can flex to conform to that resilience without having to be resilient themselves. The thickness of the base cushion layer and other layers will be chosen with consideration of the requirements of the particular application intended. For example, base cushion layer thicknesses in the range from 0.6 to 5.0 mm have been found to be appropriate for various applications. In some embodiments of the present invention, the base cushion layer is about 2.5 mm thick, and any oil-barrier and/or wear-resistant toner-release layers thereover are each about 25 to 30 micrometers thick.

The core of the fuser member is usually cylindrical in shape. It comprises any rigid metal or plastic substance. Metals are preferred when the fuser member is to be internally heated, because of their generally higher thermal conductivity. Suitable core materials include, for example, aluminum, steel, various alloys, and polymeric materials such as thermoset resins, with or without fiber reinforcement.

To form the base cushion layer of a fuser member in accordance with the invention, the structure I polymer, a slight excess of the stoichiometric amount of multifunctional silane to form crosslinks with all the vinyl groups of the structure I polymer, and the appropriate amount of tin oxide filler are thoroughly mixed on a three-roll mill. The catalyst is then added to the mix with thorough stirring. The mix is then degassed and injected into a mold surrounding the fuser member core to mold the material onto the core. The covered core remains in the mold for a time sufficient for some crosslinking to occur (e.g., 18 hours). The covered roll is then removed from the mold and heated to accelerate the remaining crosslinking. The other layer or layers are then coated thereover by any appropriate method.

The following examples are presented to further illustrate some specific fuser member base cushion layer materials in accordance with the invention and to compare their properties with base cushion layer materials not useful in accordance with the invention.

EXAMPLE 1

35 Vol % $SnO_2$ in 100% Polydimethylsiloxane

Sample slabs of tin-filled, addition-crosslinked siloxane elastomer were prepared by mixing siloxane, crosslinking agent, and filler on a three-roll mill. Catalyst was then stirred into the mixture. The mixture was placed in a mold and allowed to crosslink at room temperature. The sample was removed from the mold after about 3 hours. The sample was then placed in an oven at 175° C. for 11 hours.

The siloxane was a vinyldimethyl terminated polydimethylsiloxane marketed by Huls America, Inc., Piscataway, N.J., as PS442. This material has a viscosity of 500. The siloxane was added so as to provide a final concentration of 60.52 volume percent (19.16 weight percent).

The crosslinking agent used was a trimethylsilyl terminated polymethylhydrosiloxane, marketed by Huls of America, Inc., as PS123. This material has a viscosity of 25 to 30, a molecular weight of 2,000 to 2,500, and a methylhydro weight percentage of 30 to 35 (with the remainder dimethyl). The crosslinker was added to provide a volume percentage of 3.0 (0.96 weight percent). Tin oxide particles were added to provide a concentration of 35 volume percent (79.4 weight percent).

The catalyst used was added to provide a volume percentage of 1.51 (0.48 wt %) of a catalyst solution. The catalyst solution was prepared by mixing 0.10 grams of products PC075 and 10 grams of product PS441.2, both marketed by Huls of America, Inc. Product PC075 is a neutral platinum divinyl complex (2–3% platinum concentration) of chloroplatinic acid and vinyl terminated polydimethylsiloxane. PS441.2 is a vinyldimethyl terminated polydimethylsiloxane having a viscosity of 200.

Figure 1:
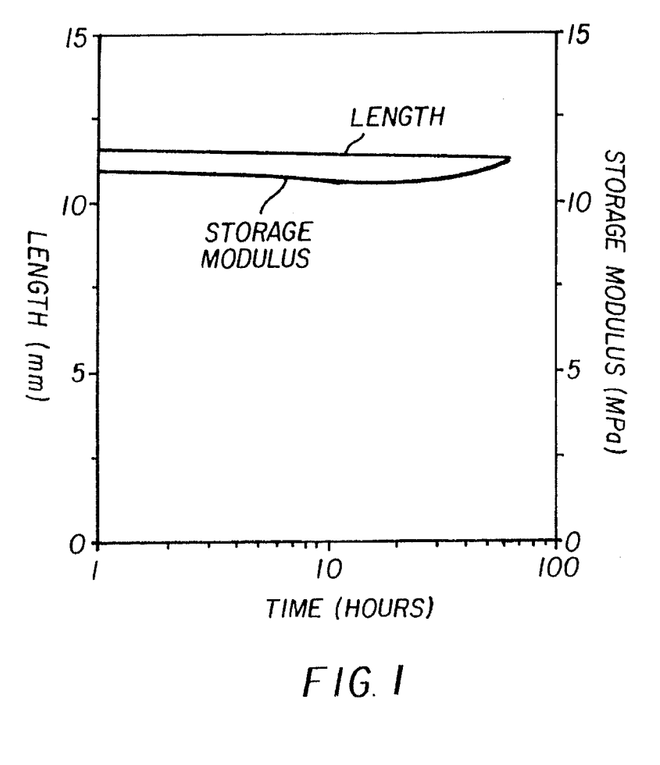
FIG. 1 is a graph of fractional length and storage modulus vs. time for the material of Example 1.
Figure 2:
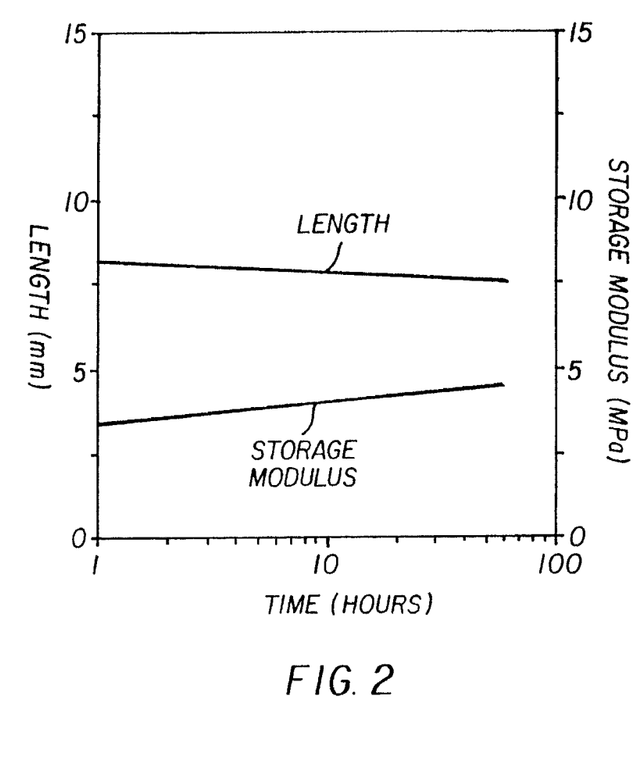
FIG. 2 is a graph of fractional length and storage modulus vs. time for the material of Example 2.
Figure 3:
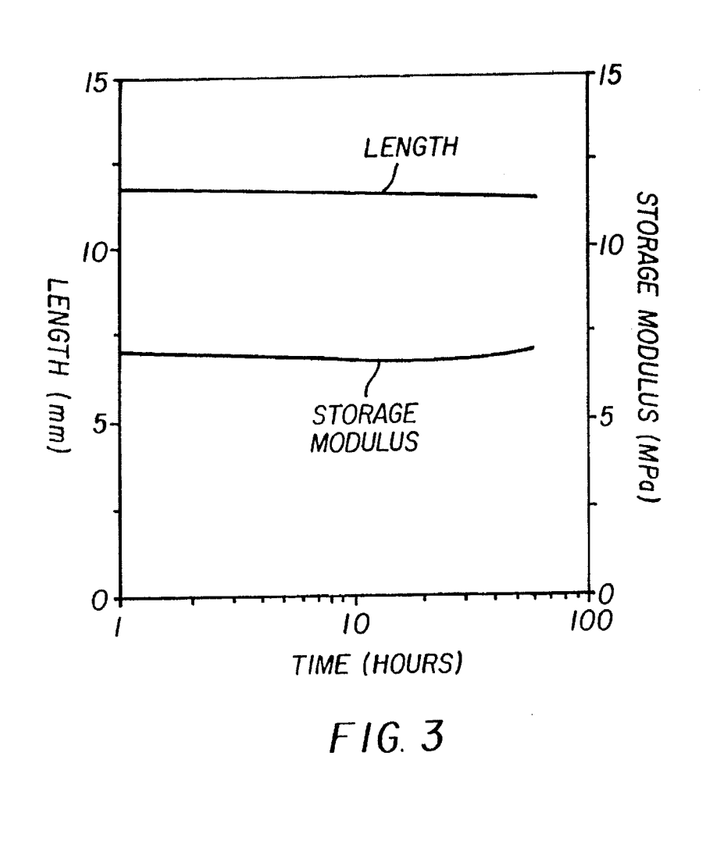
FIG. 3 is a graph of fractional length and storage modulus vs. time for the material of Example 3.
Figure 4:
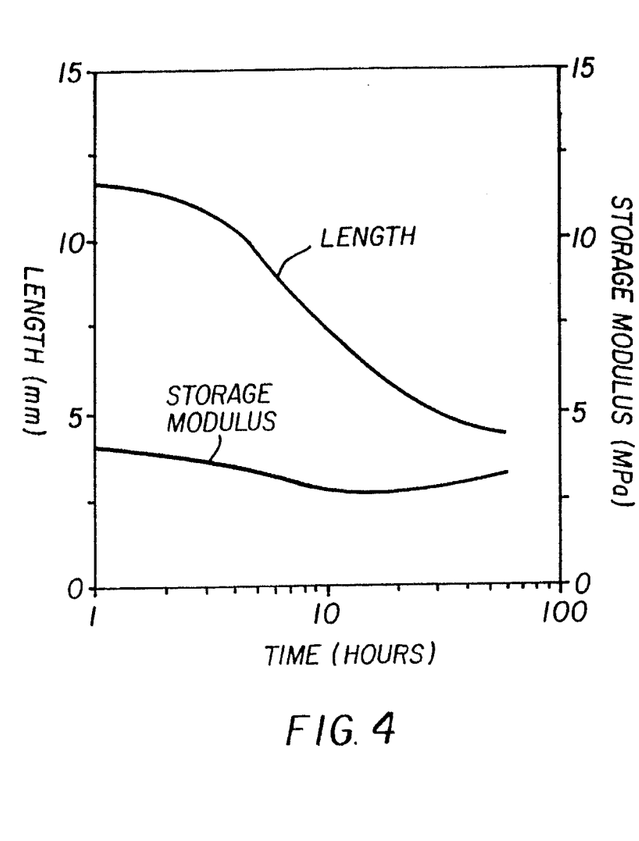
FIG. 4 is a graph of fractional length and storage modulus vs. time for the materials of Comparative Example A.

Circular disks (12 mm diameter) were cut from the slab. The storage modulus determination was done in accordance with the method of calculation described in Fitzgerald, et al., "The Effect of Cyclic Stress on the Physical Properties of a Poly(dimethylsiloxane) Elastomer", Polymer Engineering and Science, Vol. 32, No. 18 (September 1992), pp. 1350–1357. Six of the circular disks were stacked, one upon the other, weighed, and then placed in a test instrument called a Mechanical Energy Resolver (also referred to herein as an "MER"), commercially available from Instrumentors, Inc. Strongsville, Ohio, U.S.A. The instrument heated the stack to 218° C. and imposed a static compressive force of 8 kg on the stack. The length of the stack under the initial compressive force was then measured, as was the initial hardness (expressed in terms of "Initial storage modulus"). The MER then imposed cyclic stress on the sample stack by sinusoidally varying the initial compressive force by 4 kg rms at a frequency of 30 Hz for 60 hours, while maintaining the 218° C. temperature. After 60 hours, the final hardness ("Final storage modulus") and length of the six-disk stack under the static 8 kg compressive force were measured, as was the final weight of the sample stack. Results of these tests are presented in FIG. 1 and Table 1.

A fuser member in accordance with the invention could be prepared as follows. The outer surface of a rigid cylindrical aluminum core would be scrubbed clean, rinsed with hot water, and dried. To this core would be applied a thin layer of primer (obtainable commercially from General Electric Co., U.S.A., under the trade designation S54044) using a brush and then drying in ambient air (room temperature) for one hour.

The results show that the aluminum oxide filled addition cured polysiloxane of Comparative Example A was much more unstable under conditions of elevated temperature and cyclic stress than the tin oxide filled addition cured polysiloxane of the Examples, exhibiting much more weight loss and creep (change in length). There was much less change in the storage modulus in Examples 1 and 3 than in Comparative Example A. The storage modulus results in Example 2 are explainable as being due to fewer curing sites in the crosslinker of the elastomer.

TABLE 1

| EXAMPLE or COM. EXAMPLE | STORAGE MODULUS | | | LENGTH | | | WEIGHT |
| --- | --- | --- | --- | --- | --- | --- | --- |
| | Init. (MPa) | Final (MPa) | Change (MPa) | Init. | Final | Change (%) | LOSS (%) |
| Example 1 | 11.3 | 11.2 | 0.01 | 11.7 | 11.2 | 4.3 | 0.55 |
| Example 2 | 2.9 | 4.6 | 59 | 8.3 | 7.5 | 9.6 | 0.94 |
| Example 3 | 7.3 | 7.1 | 2.7 | 11.8 | 11.4 | 3.4 | 0.24 |
| COM EX A | 4.4 | 3.2 | 27 | 12.0 | 4.4 | 63 | 6.27 |

The base cushion layer formulation described above would then be injected into a mold surrounding the core to mold the base cushion layer to the core. The material would then be left in the mold at room temperature for 15 hours and subsequently heated to 175° C. for 22 hours. The covered roll would then be cooled to room temperature and removed from the mold. An oil-barrier layer of poly(vinylidene fluoride-co-hexafluoropropylene) (obtainable commercially from DuPont, U.S.A., under the trademark, Viton A) could then be coated to a thickness of about 25 micrometers on the base cushion layer to yield the final fuser member.

EXAMPLE 2

35 Vol % SnO$_2$ in 100% Polydimethylsiloxane

The procedures of Example 1 were substantially followed, except that the crosslinking agent was a trimethylsilyl terminated polymethylhydrosiloxane, marketed by Huls of America, Inc., as PS123.5. This material has a viscosity of 25 to 35, a molecular weight of 2,500 to 3,500, and a methylhydro weight percentage of 15 to 18 (with the remainder dimethyl). Results are presents in FIG. 2 and Table 1.

EXAMPLE 3

35 Vol % SnO$_2$ in Poly(16 Wt % Diphenyl-84 Wt % Dimethyl)siloxane

The procedures of Example 1 were substantially followed, except that the polysiloxane used was PS784 (Huls of America) a vinyl-terminated, 16 weight percent diphenyl-84 weight percent dimethyl siloxane copolymer having a molecular weight of about 35,000. Results are presents in FIG. 3 and Table 1.

COMPARATIVE EXAMPLE A

35 Vol % Aluminum Oxide in 100% Polydimethylsiloxane

The procedures of Example 1 were substantially followed, except that 35 vol. % aluminum oxide was used in place of 35 vol. % tin oxide. Results are presents in FIG. 4 and Table 1.

The invention has been described in detail with particular reference to certain preferred embodiments thereof, but it should be appreciated that variations and modifications can be effected within the spirit and scope of the invention.

What is claimed is:

1. A fuser member comprising a core and a layer overlying said core, said layer comprising: an elastomer, said elastomer being the product of addition crosslinking vinyl substituted multifunctional siloxane polymer having a weight average molecular weight from 7,000 to 100,000, said vinyl substituted multifunctional siloxane polymer consisting essentially of repeating units having the general structures:

and terminal units having the general structure:

wherein

R is alkyl having from 1 to 8 carbons, or aryl having a solitary ring and from 6 to 14 carbons including carbons of any ring substituents;

$Z^r$ is alkyl having from 1 to 8 carbons, olefin having from 2 to 8 carbons and a terminal vinyl moiety, or aryl having a solitary ring and from 6 to 14 carbons including carbons of any ring substituents; and

L is —O—, or —(CH$_2$)$_e$—, where e is an integer from 1 to about 8;

with the proviso that at least two $Z^r$ moieties are olefinic groups having from 2 to 8 carbons; and the proviso that less than 25 percent of said R groups are aryl; said layer having tin oxide particles dispersed therein in a concentration of from 20 to 40 percent of the total volume of said layer.

2. The fuser member of claim 1 wherein said elastomer is the product of addition crosslinking said vinyl substituted multifunctional siloxane polymer and multifunctional organo-hydrosiloxane.

3. The fuser member of claim 2 wherein said vinyl substituted multifunctional siloxane polymer has the general structure:

wherein

R is alkyl having from 1 to 8 carbons, or aryl having a solitary ring and from 6 to 14 carbons including carbons of any ring substituents;

Z is an olefinic group having from 2 to 8 carbons and a terminal vinyl moiety;

$Z^r$ is alkyl having from 1 to 8 carbons, olefin having from 2 to 8 carbons and a terminal vinyl moiety, or aryl having a solitary ring and from 6 to 14 carbons including carbons of any ring substituents;

L is —O—, or —(CH$_2$)$_e$—, where e is an integer from 1 to about 8;

n, m, j, k and p are integers such that the weight average molecular weight of said siloxane polymer is from 7,000 to 100,000;

j+k is less than 5 percent of the total of n+m+j+k; and $0 \leq p \leq (j+2k)$;

with the proviso that if m is 0 or 1, $Z^r$ is an olefinic group having from 2 to 8 carbons; and the proviso that less than 25 percent of said R groups are aryl.

4. The fuser member of claim 3 wherein j+k is less than about 2 percent of the total of n+m+j+k.

5. The fuser member of claim 3 wherein from about 3 to 16 percent of said R groups are phenyl and the remainder of said R groups are alkyl having from 1 to 4 carbons.

6. The fuser member of claim 3 wherein said multifunctional organo-hydrosiloxane has the general structure:

wherein q is from 3 to about 300;

Each T represents:

or both T's together represent atoms completing an organo-hydrosiloxane ring;

$R^b$ is H or $R^a$; and $R^a$ is alkyl having from 1 to 8 carbons, or aryl having a solitary ring and from 6 to 14 carbons including carbons of any ring substituents;

with the proviso that at least two $R^b$ moieties are H.

7. The fuser member of claim 2 wherein said multifunctional organo-hydrosiloxane has the general structure:

wherein q is from 3 to about 300;

Each T represents:

both T's together represent atoms completing an organo-hydrosiloxane ring;

$R^b$ is H or $R^a$; and $R^a$ is alkyl having from 1 to 8 carbons, or aryl having a solitary ring and from 6 to 14 carbons including carbons of any ring substituents;

with the proviso that at least two $R^b$ moieties are H.

8. The fuser member of claim 2 wherein said multifunctional organo-hydrosiloxane is selected from the group consisting of 1,3,5,7-tetramethylcyclotetrasiloxane; and compounds having the structural formula:

wherein $q^1+q^2=q$, and q is a number such that the molecular weight is from about 2,000 to 2,500.

9. The fuser member of claim 2 wherein said olefin substituted multifunctional siloxane polymer has the general structure:

wherein

R is alkyl having from 1 to 8 carbons, or aryl having a solitary ring and from 6 to 14 carbons including carbons of any ring substituents;

Z is an olefinic group having from 2 to 8 carbons and a terminal vinyl moiety;

$Z^r$ is alkyl having from 1 to 8 carbons, olefin having from 2 to 8 carbons and a terminal vinyl moiety, or aryl having a solitary ring and from 6 to 14 carbons including carbons of any ring substituents; and n and m are integers such that the weight average molecular weight of said siloxane polymer is from 7,000 to 100,000;

with the proviso that at least two of the Z and $Z^r$ groups are olefin having from 2 to 8 carbons; and the proviso that less than 25 percent of said R groups are aryl.

10. The fuser member of claim 9 wherein each $Z^r$ is an olefinic group having from 2 to 8 carbons.

11. The fuser member of claim 10 wherein m is 0.

12. The fuser member of claim 10 wherein R is methyl.

13. The fuser member of claim 9 wherein each $Z^r$ is alkyl having from 1 to 8 carbons, or aryl having a solitary ring and from 6 to 14 carbons including carbons of any ring substituents.

14. The fuser member of claim 13 wherein R is methyl.

15. The fuser member of claim 2 wherein said vinyl substituted multifunctional siloxane polymer has at least two moieties having the general structure:

where d is an integer from 0 to about 6.

16. The fuser member of claim 15 wherein d is from 0 to 3.

17. The fuser member of claim 2 wherein said vinyl substituted multifunctional siloxane polymer is selected from the group consisting of polymers having the structural formula:

or the structural formula:

or the structural formula:

wherein, in the above formulas, d is an integer from 0 to 6;

$n^1 + n^2 = n$;

$n^1/n^2 > 3$; and n or n and m are integers such that the weight average molecular weight of said siloxane polymer is from 7,000 to 100,000.

18. A fuser member comprising a core and a layer overlying said core, said layer comprising: an addition crosslinked polyorganosiloxane elastomer, said elastomer being the addition product of:

(A) vinyl substituted multifunctional siloxane polymer having the general structure:

wherein

R is alkyl having from 1 to 8 carbons, or aryl having a solitary ring and from 6 to 14 carbons including carbons of any ring substituents, with the proviso that less than 25 percent of said R groups are aryl;

Z is an olefinic group having from 2 to 8 carbons and a terminal vinyl moiety;

$Z^r$ is alkyl having from 1 to 8 carbons, olefin having from 2 to 8 carbons and a terminal vinyl moiety, or aryl having a solitary ring and from 6 to 14 carbons including carbons of any ring substituents;

n and m are integers such that the weight average molecular weight of said siloxane polymer is from 7,000 to 100,000, with the proviso that if m is 0, $Z^r$ is an olefinic group having from 2 to 8 carbons and a terminal vinyl moiety; and (B) multifunctional organo-hydrosiloxane having the general structure:

wherein
q is from 3 to about 300;
each T represents:

both T's together represent atoms completing an organo-hydrosiloxane ring;
$R^b$ is H or $R^a$; and
$R^a$ is alkyl having from 1 to 8 carbons, or aryl having a solitary ring and from 6 to 14 carbons including carbons of any ring substituents;
with the proviso that at least two $R^b$ moieties are H;
said layer further comprising tin oxide particles dispersed therein in a concentration of from 20 to 40 percent of the total volume of said layer.

19. The fuser member of claim 18 wherein said multifunctional organo-hydrosiloxane has the general structure:

20. The fuser member of claim 18 wherein said vinyl substituted multifunctional siloxane polymer has the general structure:

or the general structure:

or the general structure:

wherein $n^1+n^2=n$ and $n^1/n^2 > 3$.

* * * * *

UNITED STATES PATENT AND TRADEMARK OFFICE
CERTIFICATE OF CORRECTION

PATENT NO. : 5,480,725
DATED : January 2, 1996
INVENTOR(S) : John J. Fitzgerald, et al It is certified that error appears in the above-indentified patent and that said Letters Patent is hereby corrected as shown below:

Column 14, line 34, "both" should read --or both--.

Column 17, line 20, "both" should read --or both--.

Signed and Sealed this

Fourteenth Day of May, 1996

Attest:

BRUCE LEHMAN

Attesting Officer     Commissioner of Patents and Trademarks